Patented Aug. 25, 1942

2,293,874

UNITED STATES PATENT OFFICE 2,293,874

AMINO COMPOUND

Eugene H. Woodruff, Kalamazoo, Mich., assignor to The Upjohn Company, Kalamazoo, Mich.

No Drawing. Application May 25, 1939,
Serial No. 275,638

3 Claims. (Cl. 260—570.8)

This invention relates to improvements in amino compounds.

This invention relates to a new and useful product which is physiologically active as a therapeutic agent for the production of pressor effects in shrinking engorged nasal mucosa.

The objects of the invention are:

First, to produce a new and useful product.

Second, to produce such a product which is physiologically active as a therapeutic agent capable of producing pressor effects in shrinking engorged nasal mucosa.

Third, to produce such a product which is physiologically active and which has a relatively low toxicity.

Fourth, to produce such a product which is liquid and sufficiently volatile to be useful in treating engorged nasal mucosa by inhalation.

Other objects and advantages will appear from the description to follow. The invention is pointed out in the claims.

My new product may be termed $\beta$-o-methoxy phenyl-n-propylamine. The structural formula is as follows:

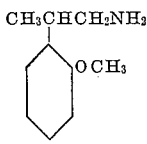

I produce this product in the following manner:

Ethyl-($\beta$-methyl)-o-methoxy cinnamate is formed as follows: 75 grams (0.5 mole) of o-methoxy acetophenone, 100 grams (0.6 mole) ethyl bromacetate, 50 grams of zinc-copper alloy shavings (8 per cent copper) and 250 cc. of anhydrous benzene are placed in a one-liter round-bottomed flask equipped with a reflux condenser. The reactants are heated on a steam bath until a vigorous reaction sets in whereupon the heat is withdrawn until the violence has subsided. The solution is then refluxed an additional 45 minutes to complete the reaction.

After cooling the zinc complex is decomposed by adding a large excess of cold dilute sulfuric acid. The solution is then filtered with suction to remove any undissolved zinc and copper. The orange colored benzene solution is separated from the aqueous layer and dried over anhydrous magnesium sulfate.

The dried benzene solution is refluxed for 30 minutes with 30 cc. of phosphorous oxychloride in a one-liter round-bottomed flask. The cooled deeply colored solution is washed twice with cold water to remove the phosphorous oxychloride and then dried over anhydrous magnesium sulfate. After removal of the solvent the product is distilled under reduced pressure. This product has a boiling point of 160° at 13 mm. of mercury. This yields 77 grams or 70 per cent of the theoretical.

o-Methoxy-$\beta$-methyl cinnamic acid is then formed from this product as follows:

110 grams (0.5 mole) of the ester is saponified by refluxing for two hours with 56 grams (1 mole) of potassium hydroxide made up to a 50 per cent solution, enough alcohol being added to completely dissolve the ester. After refluxing for two hours the solution is poured into two liters of water. The alcohol is removed under diminished pressure and the cooled alcohol-free solution extracted with ether to remove unsaponified material. After expelling the ether the solution is acidified with concentrated hydrochloric acid. The acid is extracted with ether, and after removal of the solvent distilled. This product has a boiling point of 191° at 13 mm. of mercury. This yields 68 grams or 70 per cent of the theoretical. The acid may be recrystallized from a benzene-petroleum ether mixture. A mixture of geometric isomers having a melting point of 76° is obtained.

$\beta$-(o-Methoxy phenyl) butyric acid is then produced from this product as follows:

192 grams (1.0 mole) of o-methoxy-$\beta$-methyl cinnamic acid is added to two liters of 8 per cent sodium sulfate solution containing 20 grams of sodium hydroxide. The solution is reduced electrolytically using a mercury cathode and a sheet lead anode. An apparatus that may be used for amounts of this size is described in "Organic Synthesis," col. vol. I, p. 304, H. Gilman, editor. John Wiley & Sons, N. Y.

60.0 ampere hours are used for reduction, this being about 10 per cent in excess of the amount theoretically necessary. The solution in the cathode compartment is filtered and acidified with sulfuric acid. The acid separating is extracted with ether, the solution dried and after removal of the solvent vacuum distilled. The product has a boiling point of 171° at 11 mm. of mercury. Upon recrystallization from benzene-petroleum ether, a solid melting point of 47° was obtained. This yields 171° grams or 88 per cent of the theoretical.

$\beta$-(o-Methoxy phenyl) butyryl chloride is then formed from this product as follows:

To 180 grams (1.5 mole) of thionyl chloride contained in a one-liter round-bottomed flask equipped with a reflux condenser and an efficient gas absorption trap is dropped over ¾ hour 194 grams (1.0 mole) of β-(o-methoxy phenyl) butyric acid. The flask is warmed gently on a steam bath during the addition of the acid and for one-half hour longer. The solution is transferred to a one-liter Claisen distilling flask and after removal of the excess thionyl chloride the β-(o-methoxy phenyl) butyryl chloride is distilled under reduced pressure. This product has a boiling point of 135–140° at 12 mm. of mercury. This yields 184 grams or 86.8 per cent of the theoretical.

β-(o-Methoxy phenyl) butyramide is then formed from this product as follows:

1500 cc. of 27 per cent ammonia water is placed in a 5-liter three-necked flask equipped with a mechanical stirrer and cooled to +10° C. by means of an ice-salt mixture. To the ice cold ammonia 212 grams (1.0 mole) of β-(o-methoxy phenyl) butyryl chloride is added at such a rate as to keep the temperature of the solution at +10 to +15° C. Gaseous NH₃ is bubbled into the solution at the same time so as to keep the aqueous solution saturated with the gas during the reaction. The solution is stirred 30 minutes after the addition of the acid chloride and is then filtered with suction to remove the amide. The solid amide is washed several times with cold water and dried at 100° C. The yield is 174.0 grams or 90 per cent of the theoretical. The amide may be crystallized from benzene and has a melting point of 125–126° C.

β-o-Methoxy phenyl-n-propylamine is then formed from this product as follows:

In a 2-liter three-necked round-bottomed flask equipped with a thermometer and a mechanical stirrer is placed 80 grams of sodium hydroxide dissolved in 800 cc. of distilled water and 88 grams of liquid bromine. The solution is cooled to 15–20° C. and 96.5 grams (0.5 mole) β-(o-methoxy phenyl) butyramide ground to pass a 20 mesh sieve is dusted over the surface of the stirred solution as fast as it will dissolve.

When the amide is in solution an air-cooled condenser is added and the solution warmed to 70° for one hour. Eighty grams of solid sodium hydroxide are added and the solution heated with stirring at 80° for one and one-half hours. Upon cooling the oil is extracted from the aqueous solution with ether, dried over anhydrous magnesium sulfate and on removal of the solvent vacuum distilled. This product has a boiling point of 122–124° at 10 mm. of mercury. It yields 55 grams or 66.6 per cent of the theoretical.

The hydrochloride melting point of 134–5° C. may be prepared by bubbling dry HCl gas into an absolute ether solution of the amine.

The free amine is sufficiently volatile to be used in treating engorged nasal mucosa or may be applied locally in an oil or other suitable solution. The salt is applied in an oil or other suitable solution.

Other salts of the amine may be employed such as salts of inorganic mineral acids such as sulfuric and phosphoric. If it is desired, organic carboxylic acids may be employed, acetic acid being one of these. Salts of heavy organic acid such as oleic, stearic and palmitic may be used. These are particularly adaptable for dissolution in mineral oil.

The products are effective as therapeutic agents for producing pressor effect to open engorged nasal muscosa. The pressor effect is about 1/150 that of epinephrine. The bronchodilator effect is about 1/40 that of epinephrine. One particular advantage of the product is its low toxicity. A dose of 80 mm. per kilo body weight in rats will kill 50 per cent of the rats.

Having thus described my invention, what I claim as new and desire to secure by Letters Patent is:

1. A salt of β-o-methoxy phenyl-n-propylamine having a pressor effect about 1/150 that of epinephrine and a bronchodilator effect about 1/40 that of epinephrine, and having a low toxicity.

2. β-o-Methoxy phenyl-n-propylamine having a pressor effect about 1/150 that of epinephrine and a bronchodilator effect about 1/40 that of epinephrine, and having a low toxicity.

3. A salt of an acid selected from a group consisting of inorganic mineral acids, organic carboxylic acids and β-o-methoxy-phenyl-n-propylamine having a pressor effect about 1/50 that of epinephrine and a bronchodilator effect about 1/40 that of epinephrine and having a low toxicity.

EUGENE H. WOODRUFF.